United States Patent [19]

Brastow et al.

[11] 4,388,513

[45] Jun. 14, 1983

[54] HIGH VOLTAGE WELDING

[75] Inventors: Carl H. Brastow, Foxboro, Mass.; Joel D. Mallett, Warwick, R.I.; Douglas J. Livingston, New London, N.H.

[73] Assignee: Conceptual Engineering Associates, Inc., Foxboro, Mass.

[21] Appl. No.: 229,553

[22] Filed: Jan. 29, 1981

[51] Int. Cl.³ .......................... B23K 9/14; B23K 9/12
[52] U.S. Cl. .................................. 219/58; 219/56; 219/51; 219/52; 219/125.1; 219/130.4
[58] Field of Search ................. 219/51, 52, 56, 125.1, 219/130.4, 137 R, 56.22, 58

[56] References Cited

U.S. PATENT DOCUMENTS

| | | |
|---|---|---|
| 1,612,388 | 12/1926 | MacFarland . |
| 2,203,151 | 6/1940 | Iversen . |
| 2,644,070 | 6/1953 | Herbst . |
| 3,394,241 | 7/1968 | Sparrow et al. . |
| 3,431,387 | 3/1969 | Seaman et al. . |
| 3,459,996 | 8/1969 | Adamson et al. ................ 219/130.4 |
| 3,562,486 | 2/1971 | Hatch et al. . |
| 3,654,418 | 4/1972 | Meacher et al. ..................... 219/56 |
| 3,795,786 | 3/1974 | Chanowitz . |
| 4,142,086 | 2/1979 | Rotilio ............................ 219/137 R |
| 4,319,112 | 3/1982 | Connolly .............................. 219/56 |

FOREIGN PATENT DOCUMENTS 455004  7/1971  Australia .

Primary Examiner—C. C. Shaw
Attorney, Agent, or Firm—John A. Haug

[57] ABSTRACT

An electrode (75) disposed within an insulating sleeve (86) is placed adjacent a work piece (9) to provide a selected gap between the electrode and the work piece. The atmosphere between the electrode and the work piece is first ionized and then a welding arc discharges between the electrode and the work piece. The orientation of the electrode can be adjusted by rotation of the electrode assembly (36), the amount of the gap by rotation of member (78), vertical placement of the electrode head 36 by eccentric means 40 and spacing between the terminus of the forward movement of arm (32) and the work piece station by adjusting the position of stop (54). Spacing of the electrode from the work piece enables the welding of similar and dissimilar metals such as fine wires of gold, silver, brass and others used in such applications as jewelry, medical, and electronic to provide the required strength, but without marring the surface of the work piece.

15 Claims, 17 Drawing Figures

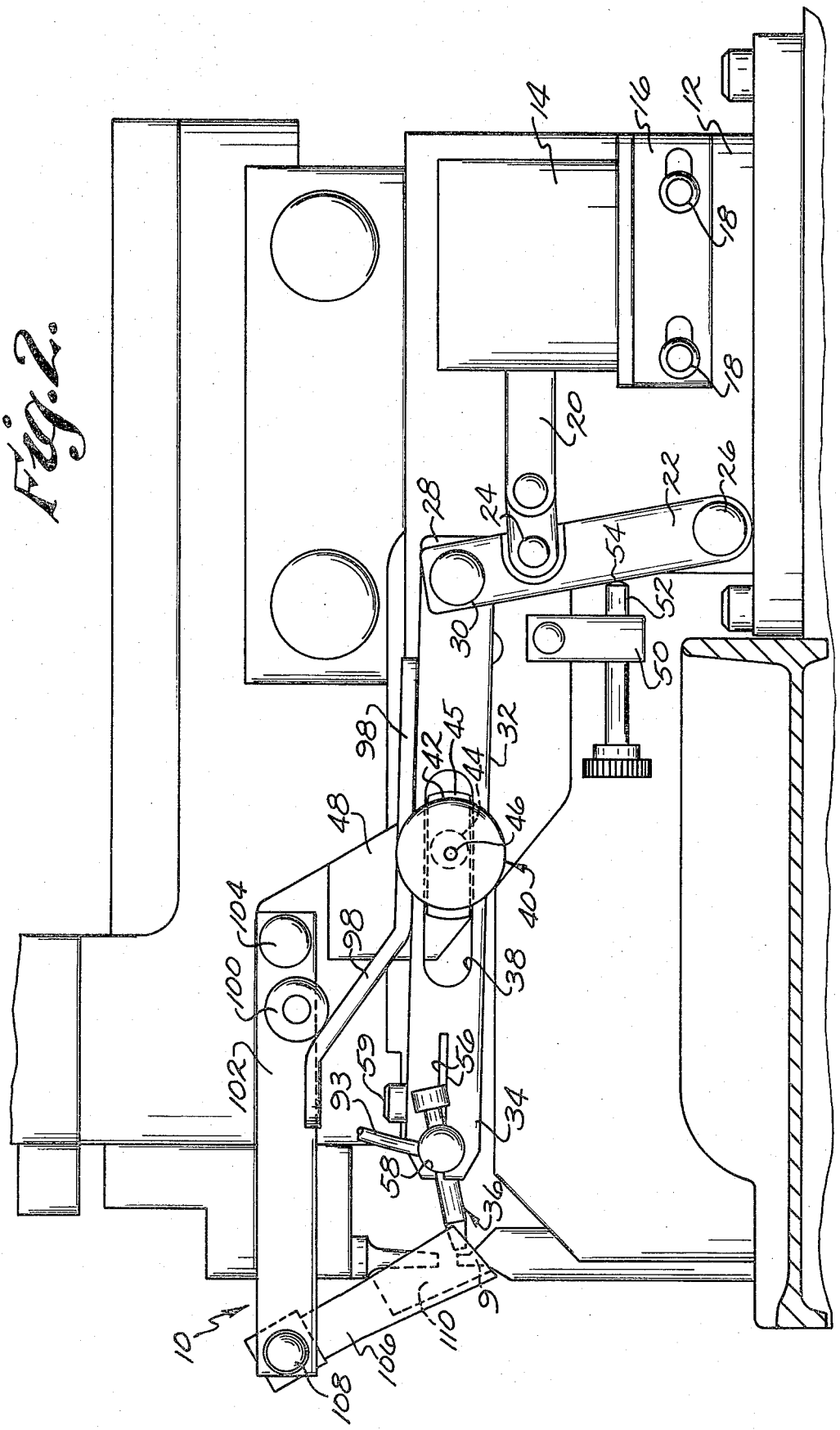

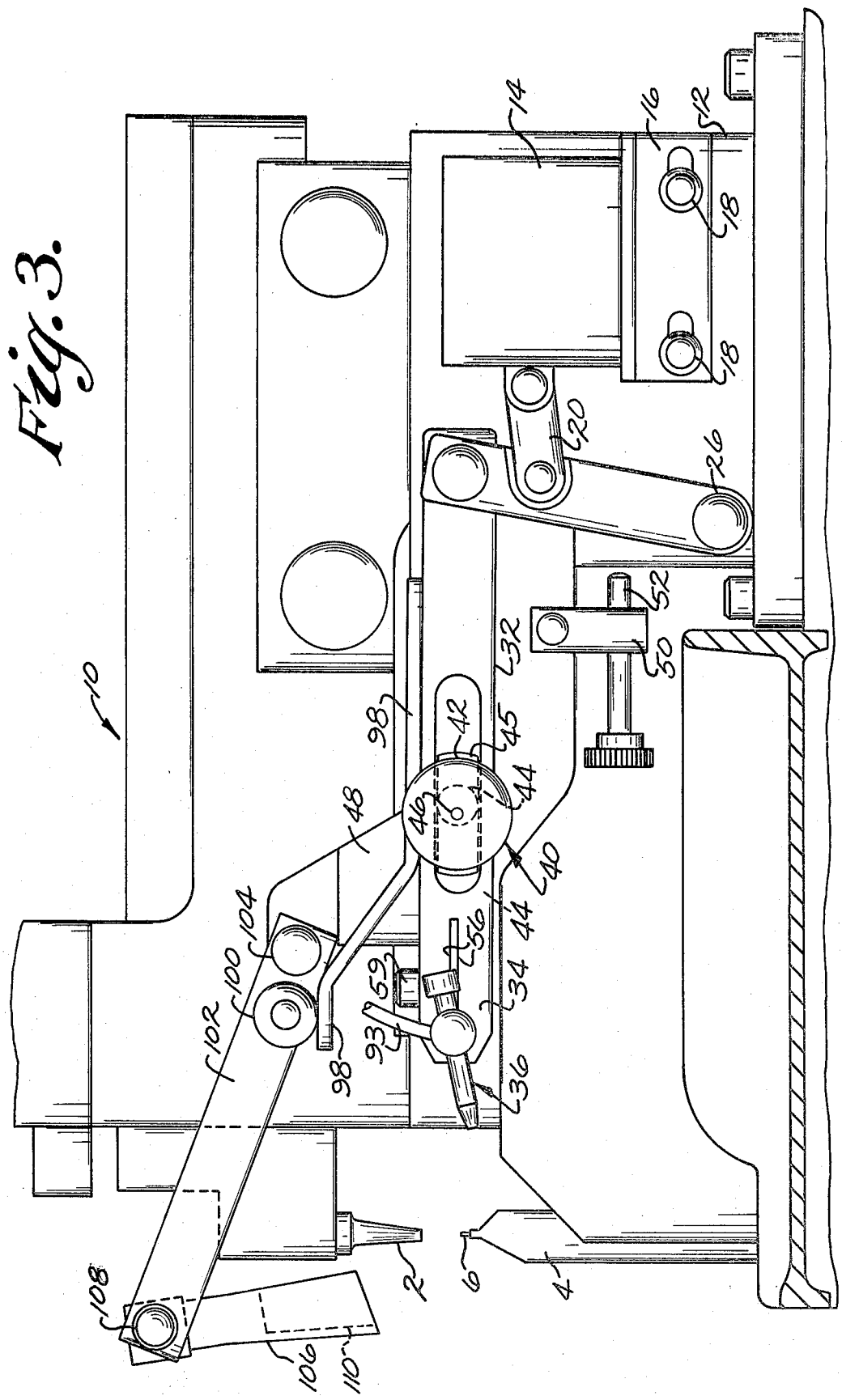

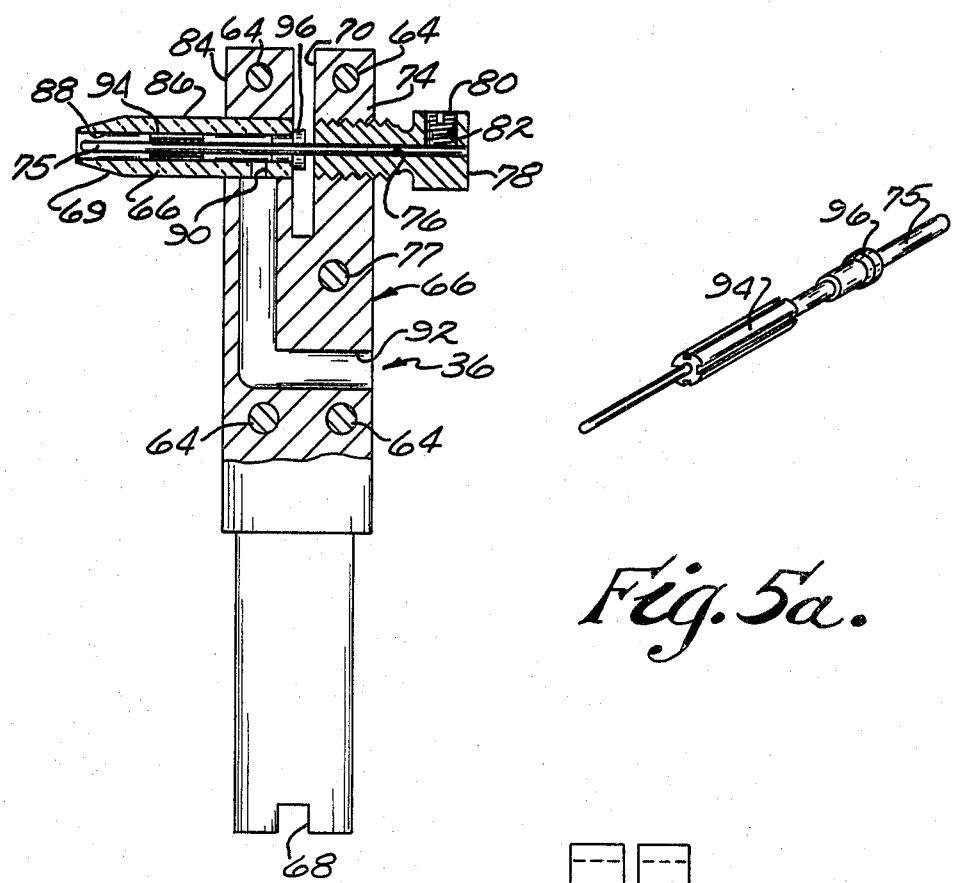
Fig.5.
Fig.5a.
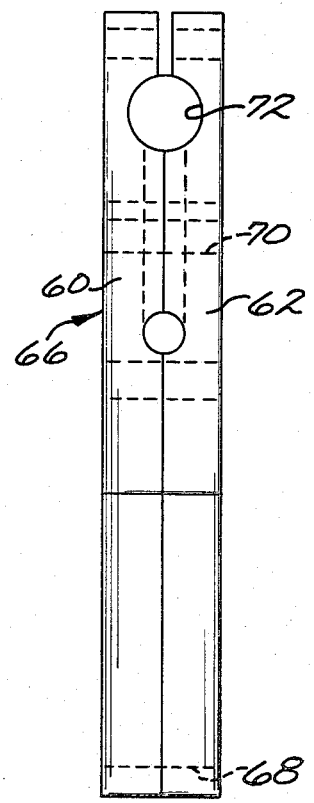
Fig.6.

HIGH VOLTAGE WELDING

DESCRIPTION

Technical Field

This invention relates generally to welding apparatus and methods and more specifically to apparatus and methods for joining similar or dissimilar metals as separate work pieces or in a closed link single work piece and is especially suited for relatively small work pieces such as those used in jewelry, medical, electronics, aerospace, and automotive applications.

Background Art

In making jewelry, for instance, it is conventional to attach ornaments and the like to a chain by taking a small diameter wire, placing a ring attached to the ornament about the wire and then forming the wire into a closed loop or link and joining the ends of the wire in a way that they will not become separated, as by soldering or welding. Soldering has generally been employed in order to avoid cosmetic defects in the surface of the link caused by welding as well as due to the difficulty of welding certain materials, such as brass or silver. Soldering, however, results in a somewhat weaker joint, is not as reliable and generally requires extra surface preparation to effect a good bond. It is an object of the present invention to provide apparatus and a method for welding the ends of such a loop or link without marring its surface. Another object is the provision of apparatus and method for joining metals, either similar or dissimilar. Yet another object of the invention is to provide a means for welding metals which are not considered normally weldable.

A conventional link forming machine may be used in carrying out the invention. One such machine comprises a work piece holder for holding the bight portion of a generally U-shaped wire. A camming surface is brought into engagement with the free ends of the wire bending the ends into a closed loop or link. The link may then be further processed by removing it from the work piece holder and subjecting it to surface preparation, soldering operations, or the like.

DISCLOSURE OF THE INVENTION

Briefly, in accordance with the invention, a welding head is mounted adjacent the link forming mechanism and is adapted to be moved to and from the link forming work station. A complete cycle for forming and welding a link is initiated by actuating a switch which causes a camming head to descend and bend the distal end portion of two upstanding legs of a generally U-shaped work piece into a closed link as described above. The camming head then ascends and an electrode head moves to the work piece and is positioned a selected distance therefrom. At the same time a shield is preferably placed between the operator and the work piece. A selected gas is directed to the work area and the atmosphere between the electrode and the work piece is ionized. Once the proper level of ionization is achieved a welding arc travels from the electrode to the work piece to effect the weld. The electrode head then retracts, the shield is removed, the work piece is released and a new work piece is presented at the work station to complete the cycle.

BRIEF DESCRIPTION OF THE DRAWINGS

The details of the invention will be described in connection with the accompanying drawings in which:

FIG. 2 is a side elevation of the welding apparatus made in accordance with the invention of the electrode head in the welding position and also showing a portion of the link forming apparatus;

FIG. 3 is a figure similar to FIG. 2 but with the electrode head in the retracted position;

FIG. 5 is an elevational view, partly in cross section, of the welding head shown in FIGS. 2 and 3;

FIG. 5a is a perspective view of the electrode used in the welding head of FIG. 5;

FIG. 6 is a side view of the welding head with the welding rod, welding rod sleeve and welding rod holder removed;

BEST MODE FOR CARRYING OUT THE INVENTION

Figure 1A:
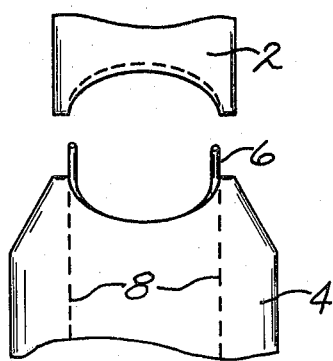
FIGS. 1a, 1b and 1c show a portion of a work piece holder, a camming head and a work piece before, during and after the work piece is formed into a closed link.
Figure 1B:
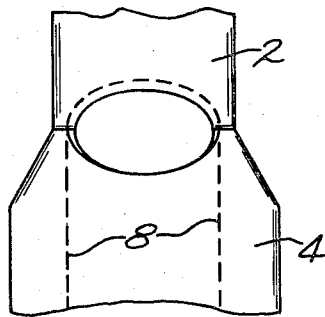
Figure 1C:
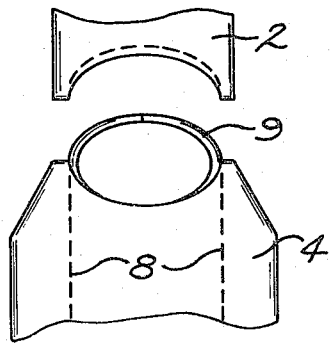

With reference to FIGS. 1a-1c, a conventional link forming device includes a camming head 2 movable rectilinearly in a vertical direction toward and away from a stationary work piece holder 4. A work piece 6 in the form of a metallic wire bent in a generally U-shaped configuration is directed through a passageway indicated by dashed lines 8 and is presented at an opening to the passageway at the top of holder 4 with the bight of the work piece held by holder 4 and with two legs extending upwardly as seen in FIG. 1a. Camming head 2 is then brought down so that a curved surface on the bottom of head 2 contacts the free distal ends of the two legs of work piece 6 and bends them together as seen in FIG. 1b. The ends of the legs can form a butt or bias joint as desired. Camming head 2 is then brought upwardly as seen in FIG. 1c with work piece 6 formed into a link 9 ready for removal from work piece holder 4 so that another U-shaped work piece can be presented for subsequent forming into a link. When in the FIG. 1a position another link, ring or some other finding may be placed over one of the upstanding legs so that it will be captured when the new link is formed.

The above described link forming device is very effective and can be used in making chains for jewelry and the like, or for attaching ornaments to a chain or any other similar purpose, however, it has a major limitation. That is, the links formed by the device are merely bend into a closed loop configuration and must be further processed to prevent having the distal end portions of the link separate from one another. This is conventionally done by a soldering operation which adds significantly to the cost, time and handling of the item being manufactured. Although attempts have been made to weld the distal ends together they have not been successfull for various reasons. Generally a separate machine has been used which adds to the cost and handling time. Further, prior art attempts have frequently resulted in the surface of the link being marred and thus unsatisfactory from a cosmetic standpoint. Yet another difficulty has been due to the materials used for the link such as brass or silver which have not been conducive to normal welding techniques.

Figure 4:
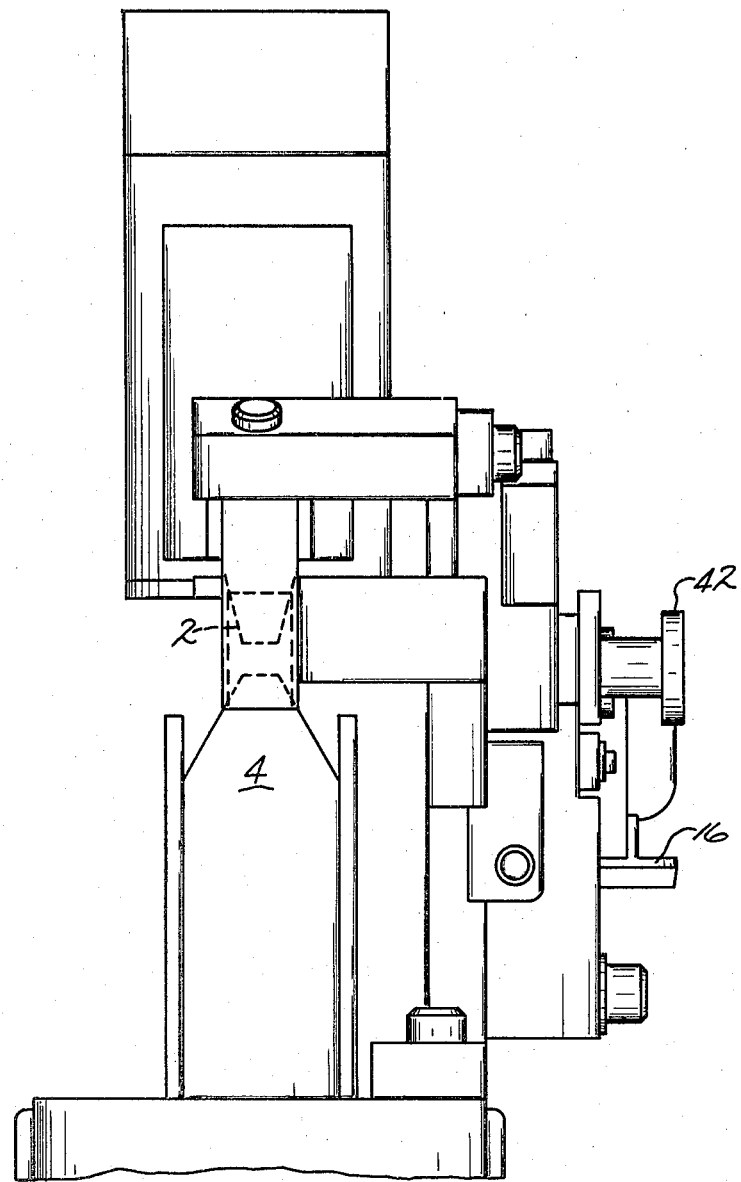
FIG. 4 is a front elevation of the FIG. 2 apparatus.

As seen in FIGS. 2-4, a welding system, generally referred to by numeral 10, comprises a base 12 on which suitable motor means 14, such as a conventional solenoid, is mounted via a generally L-shaped angle iron 16 secured to base 12 by any suitable means, such as bolts 18 shown in the drawings. Core or rod 20 extends from motor 14 and is pivotably connected to link 21 which in turn is pivotably connected at 24 to a bell crank mechanism comprising link 22 pivotably connected to base 12 at 26 and at 30 to one end 28 of an elongated arm 32. The opposite end 34 of arm 32 mounts an electrode assembly 36 to be discussed below. A slot 38 is formed in arm 32 and extends along a portion of its longitudinal axis. A height adjusting eccentric member 40 extends through slot 38 and is rotatably, adjustably connected to base 12 so that turning of member 40 will cause the free distal end 34 of arm 32 to move up or down. Eccentric 40 is preferably provided with an outer, knurrled, cylindrical surface 42, a hub 44 formed concentrically with surface 42 and with screw 46 extending through member 40 and hub 44 received in a threaded bore in plate 48 of base 12. Screw 46 is disposed eccentrically relative to cylindrical surface 42 and hub 44. Hub 44 is received in a bore which extends through block 45. Block 45 is slidingly disposed in groove 38 of arm 32 so that as rod 20 of solenoid 14 moves in and out member 32 will slide on block 45. The entire eccentric is adjustably rotated until the height of end 34 of arm 32 is at the desired position. Although block 45 is shown as a solid member which slides relative to arm 32 within slot 38 it will be appreciated that a roller bearing arrangement can be employed if desired or alternately a porous, self lubricating material can be used for block 45. A block 50 depends from plate 48 of base 12 and mounts on adjustable threaded stop 52 which serves to limit the throw of piston rod 20 by contacting link 22 at 54.

As mentioned above, electrode assembly 36 is mounted at end 34 of arm 32. Arm 32 is bifurcated at 56 and is provided with a seat portion 58 to receive therein assembly 36. A screw 59 extends through the bifurcation and is threaded in the bottom portion to securely fasten assembly 36 between the bifurcation when the screw is tightened. As seen best in FIGS. 5 and 6, electrode assembly 36 comprises opposed members 60 and 62 held together by conventional fasteners 64, such as screws. Members 60, 62 together form a generally cylindrical member 66 formed with a first slot 68 at one end face and a second slot 70 at the opposite end face. Slot 68 is adapted to receive a tool, such as a screwdriver, and permit rotation of assembly 36 within bore 58 of end 34 to provide a selected orientation of the electrode relative to the work piece to be discussed below. Slot 70 extends below a bore 72 formed through member 66 between members 60, 62. Bore 72 is threaded on side 74 of member 66 up to the slot 70. Electrode 75, an elongated rod of tungsten, or some other suitable material, is received within an axially extending bore 76 of threaded member 78. A set screw 80 is received in a bore 82 which intersects bore 76 to secure electrode 75 relative to member 78. Bore 72 extending through side 84 of member 66 on the other side of slot 70, receives a tubular ceramic sleeve element 86. Sleeve 86 has an axially extending bore 88 and has a radially extending bore 90 in communication with bore 88 and in alignment with a passageway 92 formed in member 66. Electrode 75 projects into bore 88 and is maintained centrally disposed therein by means of a splined member 94. Member 94 is splined in order to permit gas to flow from passageway 92 through sleeve 86 and out through the open end of the sleeve. A suitable plug 96 closes the other end of sleeve 86 preventing gas flow out through slot 70. Rotation of threaded member 78 provides adjustment of electrode 75 along the longitudinal axis of sleeve 86 so that the free distal end of electrode 75 can be disposed a selected distance from the mouth of sleeve 86. Preferably the outer tip portion of sleeve 86 is tapered at 69 to facilitate adjustment of the distal end of electrode 75 relative to the work piece as will be explained below. Electrical connection is made to electrode 75 through screw 77, member 66 and member 78.

With particular reference to FIGS. 2 and 3, a camming surface 98 is shown fixedly attached to arm 32 and is adapted to cooperate with a cam roller 100 mounted on a shield arm 102. Shield arm 102 is pivotably attached to plate 48 at 104. The opposite end of shield arm 102 mounts a shield 106 adjustably attached to arm 102 at 108 so that its orientation can be adjusted relative to the work piece. Shield 106 is formed with a recess 110 so that it can more completely encompass the welding area as seen in FIG. 2. As seen in that figure the position of the shield is determined by the location of camming surface 98 relative to cam roller 100. When arm 32 is retracted to the FIG. 3 position camming surface 98 moves to the right as seen in the figure causing cam roller 100 to ride up and therefore forcing shield 106 upwardly away from the work station.

In its at-rest original position the apparatus is in the FIG. 3 position (also FIG. 1a) with the free ends of work piece 6 extending upwardly from work piece holder 4. Typically a link is placed over one end of work piece 6 for attachment thereto. A cycle is initiated by an operator depressing a suitable switch, such as a foot switch. A description in greater detail of the controls for effecting the operation of the machine will be given infra, however, upon initiation of the cycle, head 2 descends forming work piece 6 into a closed loop or link 9 with the ends forming a butt or bias cut joint as desired. The electrode head assembly is then brought forward to the FIG. 2 position and a gas valve opened so that gas flows through tube 93 to passageway 92 and bore 98. Camming surface 90 moves forward with the head assembly allowing shield 106 to descend to the work piece 9 to shield the weld area from the operator. The forward movement of arm 32 is limited by link 22 engaging stop 54. This stop is adjustably located so that the outer distal end tip of ceramic sleeve 86 just contacts the work piece as seen in FIG. 2. When sleeve 86 is thus in contact with the work piece the distal end of electrode 75 is spaced from the work piece a selected distance, generally in the range of 0.001 to 0.090 inch depending on the material and configuration of the work piece. The gap between the electrode and the work piece is ionized by high voltage means such as an arc generator and when suitably ionized a welding arc from suitable energy means such as a capacitor bank jumps from the end of electrode 75 to the work piece which, through work piece holder 4 forms another electrode. The electrode head assembly is then retracted to the FIG. 3 position and the welded work piece ejected from holder 4 with a new work piece presented. The entire cycle takes in the order of a second or less to complete.

Figure 9:
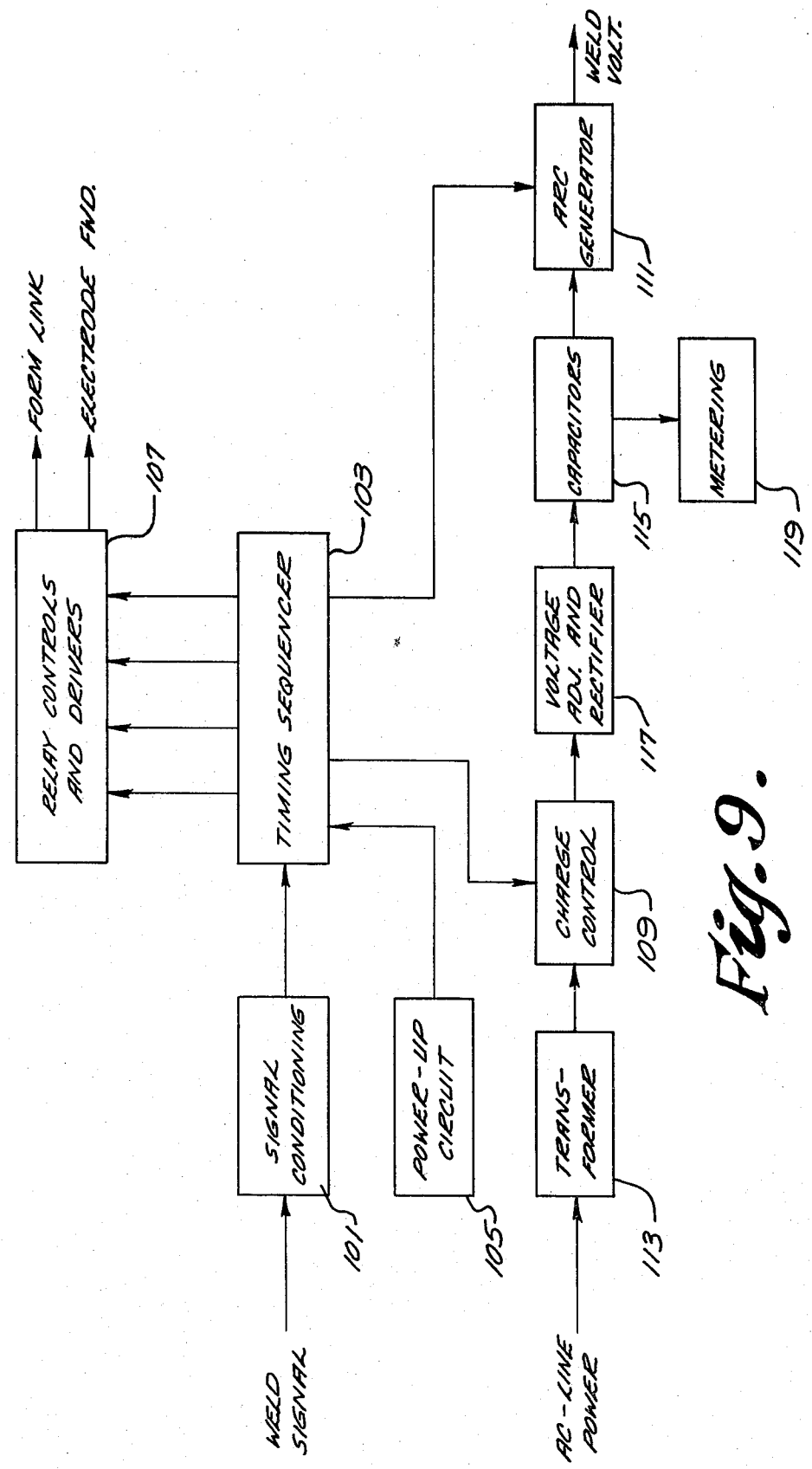
FIG. 9 depicts a functional block diagram of the electrical controls of the present invention.

With reference to FIG. 9 the electrical controls of the welding apparatus are shown in a functional block diagram. The weld signal initiated by the operator depressing a foot switch activates timing sequence, circuit portion 103 through signal conditioning circuit portion 101. The timing sequencer 103, powered by circuit portion 105, provides signals to a relay controls and driver circuit portion 107 as well as to charge control circuit portion 109 and arc generator circuit portion 111. A transformer 113 transforms standard AC line voltage to provide power for power up circuit portion 105 as well as for capacitor circuit portion 115 and arc generator circuit portion 111. Circuit portion 117 provides voltage adjustment and rectification for the power supplied to circuit portions 115 and 111. A meter 119 may be used to provide an indication of the capacitor charge voltage.

Figure 8:
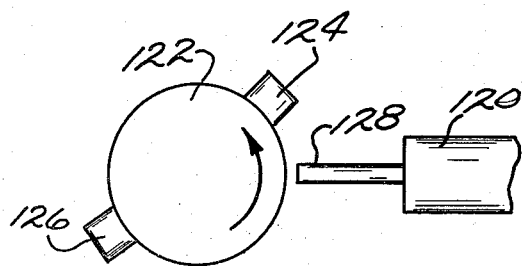
FIG. 8 is a partial view of a clutch and clutch solenoid used to control the link manufacturing cycle.
Figure 10:
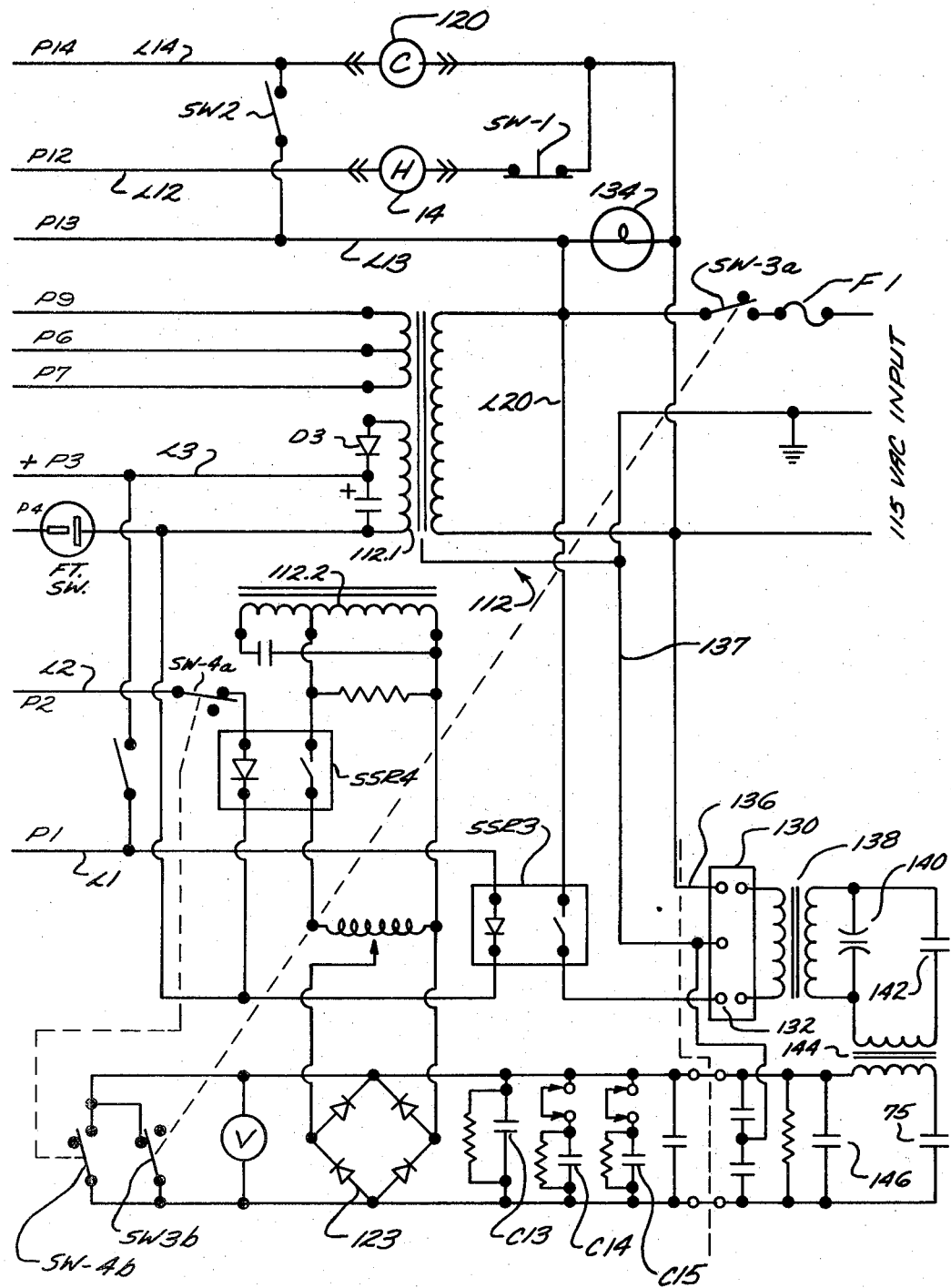
FIG. 10 is a schematic wiring diagram of a portion of the electrical controls used in the present invention.
Figure 11A:
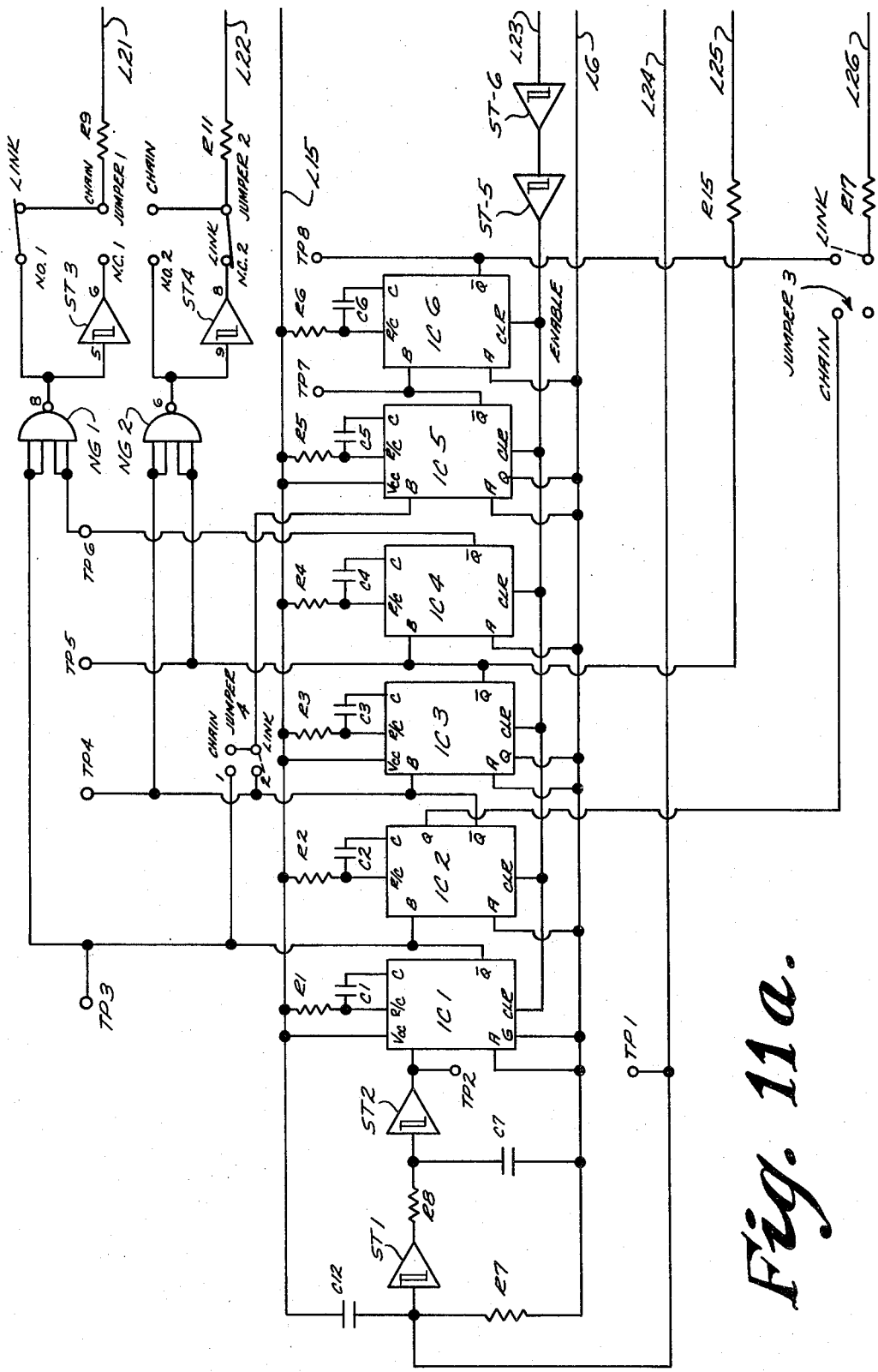
FIGS. 11a and 11b taken together are a schematic wiring diagram of the sequential control means controlling the operation of the various steps in manufacturing the link.
Figure 11B:
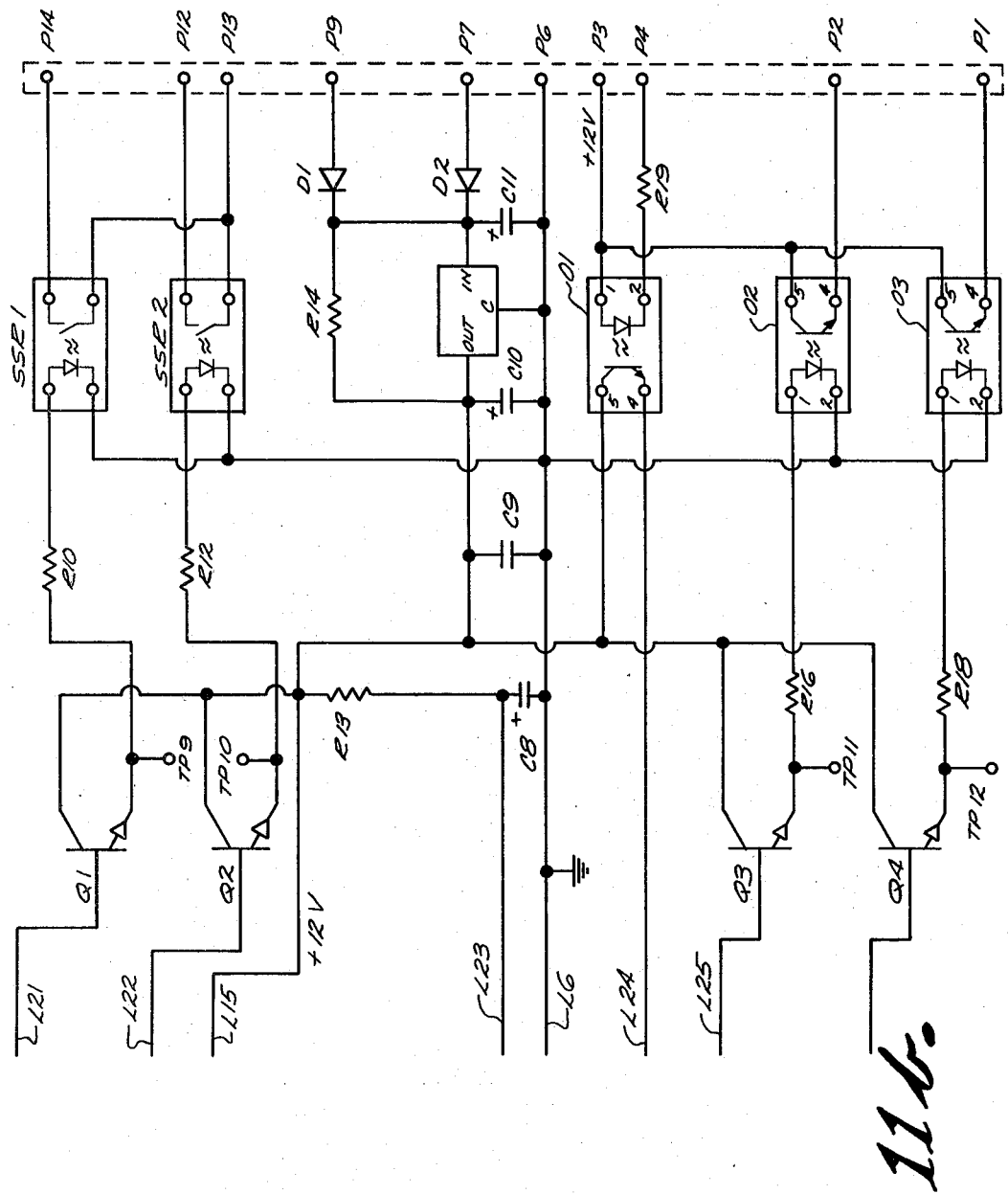
Figure 12:
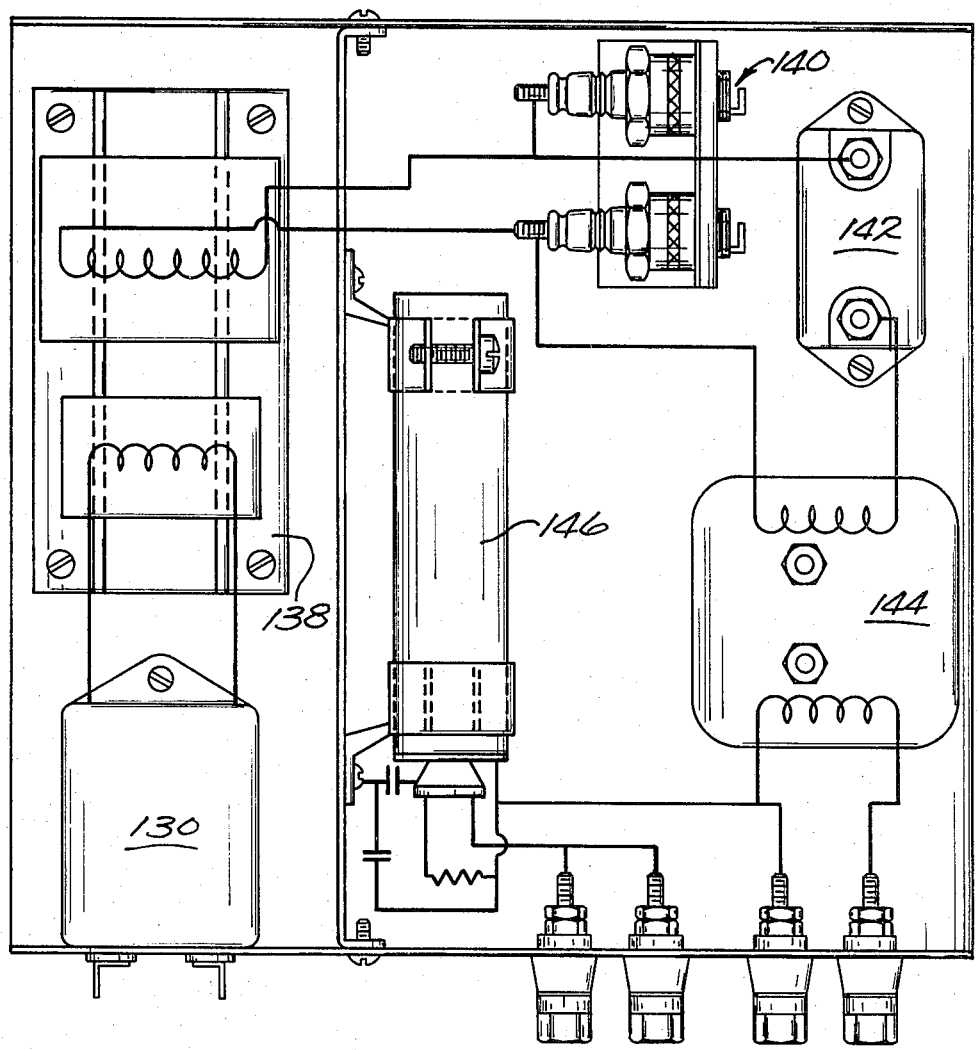
FIG. 12 is a wiring diagram of a portion of FIG. 10 used to produce an ionizing arc.

More specifically, with reference to FIGS. 10, 11a and 11b, a plurality of timers 1C1–1C6, which in one system made in accordance with the invention comprise six conventional monostable multivibrators, are connected between ground, line L6, and a twelve volt supply line L15. As mentioned above, FIGS. 11a and 11b together make up the schematic of the timing circuit used in the invention. It will be noted that lines L6, L15 and L21–L26 of FIGS. 11a and 11b interconnect with one another. A conventional foot switch FT SW (FIG. 10) is connected between pin P4 and secondary 112.1 of transformer 112. The other side of secondary 112.1 is connected through a diode D3 to line L3 connected to pin P3 and a capacitor to side 112.1 of the secondary. When the foot switch FT SW is closed a plus twelve volts turns on optical isolator 01 (FIG. 11b) which brings twelve volts into monostable multivibrator, timer IC1. The wave form is conditioned by Schmitt triggers ST1, ST2 to effect the proper transition and rise time to properly trigger IC1. The output $\overline{Q}$ of IC1 is normally high (plus twelve volts) but when triggered by the signal through the Schmitt triggers ST1, ST2, the output $\overline{Q}$ goes low and causes the output of NAND gate NG-1 to go high and turn on transistor Q1 which in turn actuates solid state relay SSR1 closing its output contacts which are connected to pins P13, P14. Line L13, connected to pin P13, (see FIG. 10) is connected to 115VAC. Line L14 is connected to a clutch solenoid 120 also seen in FIG. 8. Clutch 122 is provided with stop projections 124, 126 which are adapted to abut plunger 128 when it is in its outer or protracted position. Closing of the contacts of solid state relay SSR1 activates solenoid 120 retracting plunger 128 for a brief period of time determined by the timing constant of timer IC1, R1C1, allowing stop 124 to pass by plunger 128 and clutch 122 to rotate approximately half of a turn until stop 126 comes into abutment with the plunger which by that time has returned to the protracted position. During this half turn, head 2 (see FIGS. 1a–1c) descends bending legs 6 of the work piece to form a closed link and ascends to the FIG. 1c position.

When the output of timer ICI turns high again, determined by the time constant of R1,C1, timer IC2 is triggered and its output $\overline{Q}$ goes from a normally high to a low turning the output of NAND gate NG2 to the high voltage state which is inverted by Schmitt trigger ST4 to turn off the conductive transistor Q2 and open the closed solid state relay SSR2. Thus line L12, connected to the electrode head solenoid 14 is deenergized and plunger 20 allowed to go to the protracted position by means of a spring bias (not shown) causing the electrode head to move toward the work piece and after the time determined by R2,C2 triggers timers IC5 and IC3. Line L12 is also connected to the gas solenoid and is turned on by R2,C2 signal. The output of timer IC5, Q, having a time constant determined by R5,C5 turns on timer IC6, again having an output which does from normally high to a low for a period of time determined by R6,C6. The output of timer IC6 turns on transistor Q4 permitting current to pass through a light emitting diode in isolator Q3 thereby connecting pin 1 with 12 volts of pin 3. As seen in FIG. 10, line L1, connected to pin P1 will then energize solid state relay SSR3 so that input 132 of RFI generator 130 is connected to line L20 which is connected to 115 volt alternating current power source through an on-off switch SW-3 and a fuse F1. Line 136 is connected to the other side of this 115 volt AC power source with line 137 connected to ground. Thus the output of timer IC6 energizes the ionization arc by energizing RFI generator 130. The RFI generator energizes transformer 138 which generates a high voltage across air gaps 140 and the series combination of capacitor 142 and coupling transformer 144. As the transformer 138 voltage rises, air gaps 140 ionize, thus discharging capacitor 142 across coupling transformer 144. The coupling transformer secondary is connected in series with capacitor C13–C15 DC voltge. Capacitor 146 prevents voltage from the secondary from being fed to capacitors C13–C15. The combination of charge and discharge on transformer 138, air gap 140 and capacitor 142 occurs at a high rate, producing an effectively continuous high voltage superimposed on the capacitor C13–C15 DC voltage.

The output $\overline{Q}$ of timer IC3 is normally high. When it turns low the signal goes to the NAND gate NG2, timer IC4 and transistor Q3. Since the output of timer IC3 is normally high transistor Q3 is normally conductive causing optical isolator O2 to conduct and concomitantly solid state relay SSR4 in line L2 to close. When relay SSR4 is closed winding 112.2 of transformer 112 is energized and rectified by diode rectifier 123 through an adjustable transformer winding 112.4. This rectified direct current is then delivered to capacitors C13, C14, C15 which provide the welding arc. As shown in FIG. 10, all three capacitors are connected in the charging circuit, however, depending upon the level of charge desired, two are shown as being disconnectable. Any selected number of capacitors, of course, can be used as desired. The energy in the welding arc can be expressed in Joules where $J = \frac{1}{2}CV^2$ with C=farads and V=volts. The preferred range is between 1 and 160 Joules.

Once the $\overline{Q}$ signal from timer IC3 goes low and transistor Q3 turns off then the charging of capacitors C13–C15 is terminated.

The $\overline{Q}$ signal from timer IC3, as mentioned above, also is delivered to timer IC4. This causes another signal to be given to NAND gate NG1 retracting the clutch solenoid to permit the completion of the cycle.

Figure 13:
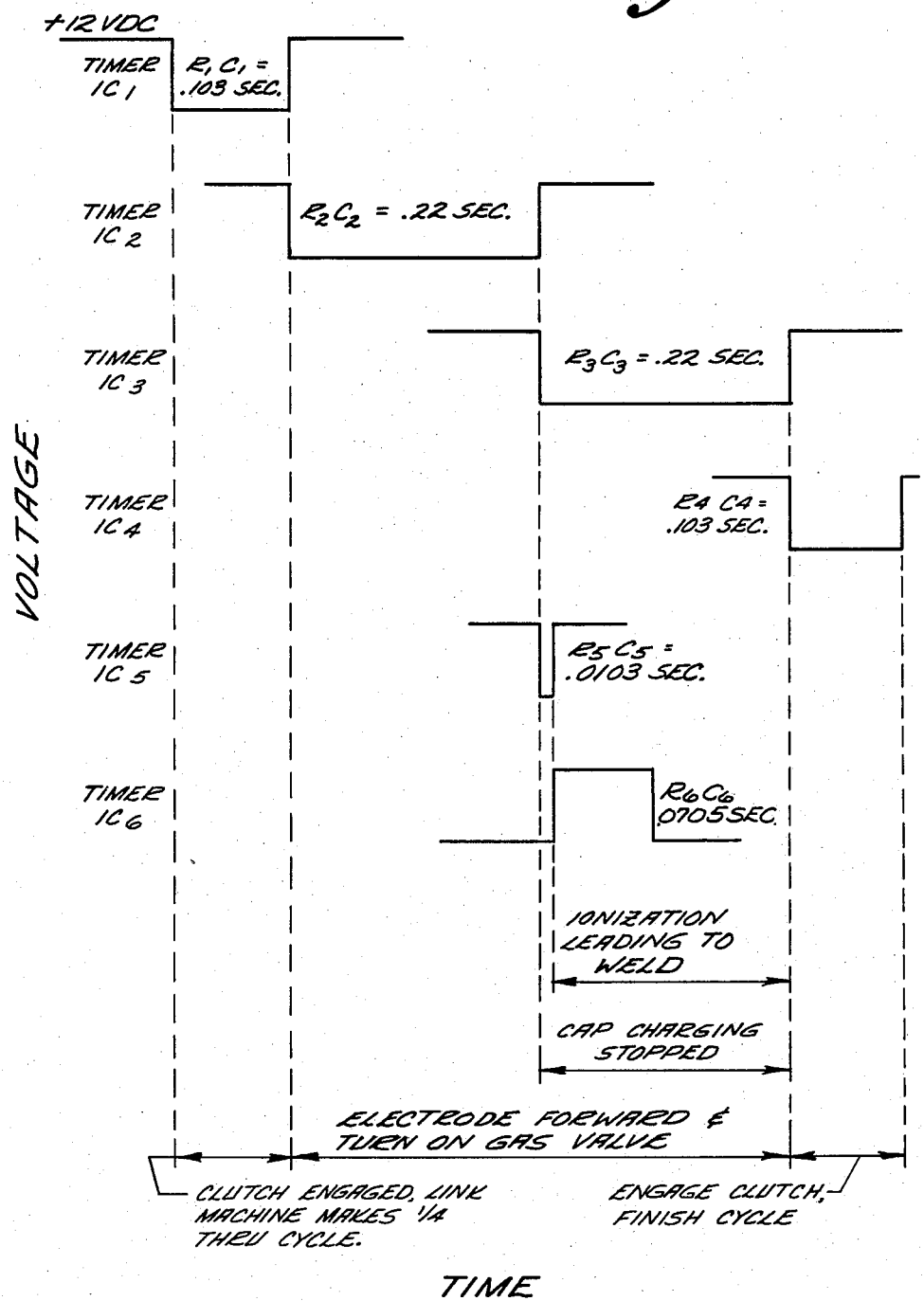
FIG. 13 shows the timing sequence of the FIGS. 11a, 11b control means.

The timing sequence of timers IC1-6 is shown in FIG. 13 with the function controlled indicated below the corresponding signal. Timer IC1 causes the clutch to make a partial cycle forming a link and initiates operation of timer IC2. Timer IC2 causes the electrode head to move forward and turns on the gas valve and initiates operation of timers IC3 and IC5. Timer IC5 initiates operation of timer IC6 which actuates the ionization means. Charging of the capacitor C13–C15 occurs during the timer IC3 signal determined by R3, C3. Finally the clutch is engaged during the timer IC4 signal to finish the cycle with the electrode head returning to the retracted position.

Figure 7:
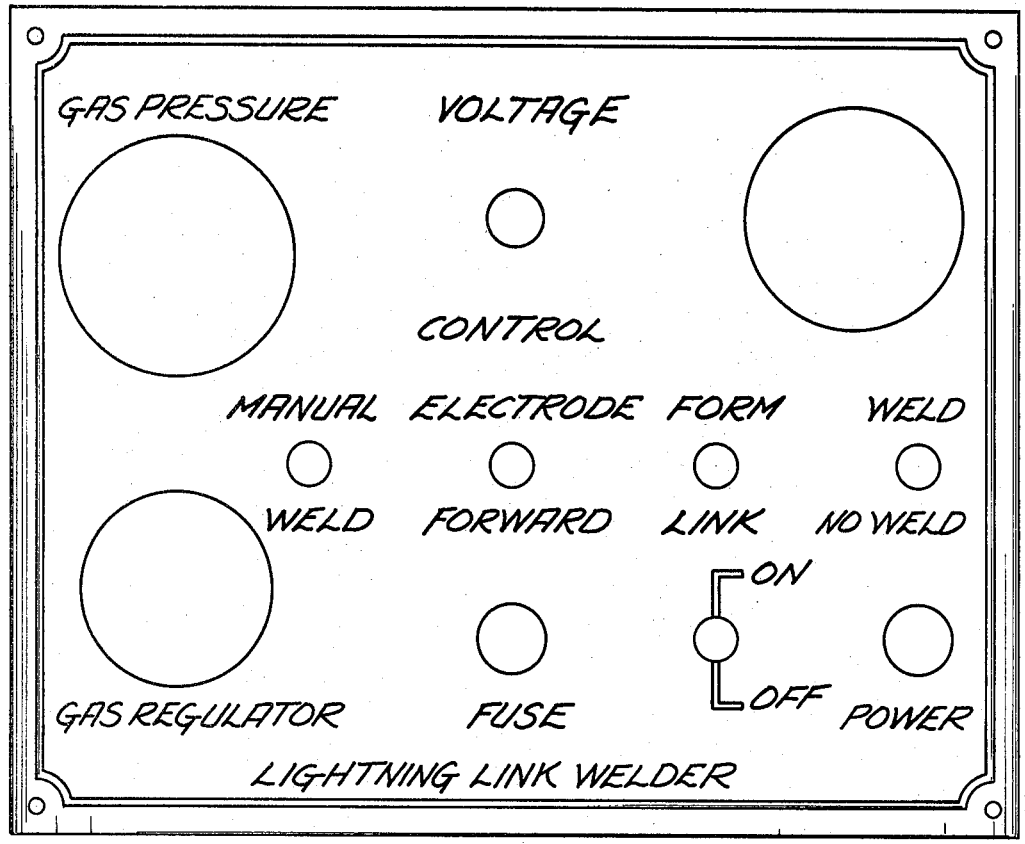
FIG. 7 is an elevational view of the control panel used with the apparatus of the instant invention.

With reference to FIGS. 7 and 10, several switches are shown which permit operation of certain portions of the apparatus without going through the entire cycle. Switch SW1 controls the position of electrode head 36. As mentioned above the electrode head solenoid is normally actuated when the machine is energized keeping head 36 retracted. The signal from timer IC2 interrupts the triggering of transistor Q2 and turns it off which causes relay SSR2 to open and deenergizes solenoid 14 to allow head 36 to move to its protracted position. Opening the normally closed switch SW-1 has the same effect since it opens line L12 which is connected to solenoid 14. Thus if it is desired to bring the head forward it can be accomplished without going through the rest of the cycle.

Clutch 122 can be engaged by closing switch SW-2 which connects the clutch solenoid 120 in line L14 to the power source via line L13.

Switch SW-3 is a double pole, double throw switch so that when switch SW-3a is closed for normal operation switch SW-3b is in the open position preventing discharge of capacitors C13–C15 except through the electrodes, however, when switch SW-3a is opened to turn off the apparatus, (as shown in the drawings) switch SW-3b is closed to permit capacitors C13–C15 to discharge.

Switch SW-4 is also a two-pole, double throw switch. When switch SW-4a is closed and the device is cycled, welding will occur, switch SW-4b being opened and having no effect on the welding capacitors. However, if switch SW-4a is opened the charging of the capacitors C13–C15 is interrupted by maintaining relay SSR4 open and by permitting discharge of the of the capacitors with switch SW-4b closed.

Jumpers 1-4 are provided to allow alternate operations by connecting as shown in the schematic (ie., connected for "link" operation) or alternatively for "chain" operation. Also shown in FIGS. 11a, 11b are a plurality of test points TP1-TP12 which are used to facilitate testing of the circuit.

In a device made in accordance with the invention, the following were employed:

| | |
|---|---|
| SSR1, SSR2 | S 30 12A (2 devices) |
| SSR3, SSR4 | S 21 8A (2 devices) |
| IC1–16 | MM74C221N (3 devices) |
| ST1-6 | MM74C14N (1 device) |
| NG1, NG2 | MM74C20N (1 device) |
| | LM342P-12 |
| O1-3 | H11A1 |
| Q1-4 | MPSA06 |
| D1, D2 | IN4003 |
| C13–C15 | GE 86F169M (15600 μf) |
| 130 | EMI Filter IRI 1A 115/250 V 50-400 Hz |

-continued

| | | | | | μf | | μf |
|---|---|---|---|---|---|---|---|
| R1 | 220K | R11 | 15K | C1 | .47 | C8 | 3.3 |
| R2 | 470K | R12 | 1K | C2 | .47 | C9 | Not Used |
| R3 | 470K | R13 | 220K | C3 | .47 | C10 | 35 |
| R4 | 220K | R14 | Not Used | C4 | .47 | C11 | 100 |
| R5 | 470K | R15 | 15K | C5 | .022 | C12 | .22 |
| R6 | 150K | R16 | 1K | C6 | .47 | | |
| R7 | 100K | R17 | 15K | C7 | .022 | | |
| R8 | 470K | R18 | 1K | | | | |
| R9 | 15K | R19 | 1K | | | | |
| R10 | 1K | | | | | | |

Voltmeter 118 referenced above with reference to FIG. 9 is seen in FIG. 10 connected across capacitors C13–C15.

Visual indicating means 134 is placed across the 115 volt power source beyond switch SW-3 to give an indication of when the welding apparatus is energized.

By way of example wire links were welded together with the following parameters:

EXAMPLE I

| | |
|---|---|
| Work piece 6 | 14 carat gold wire |
| Pre arc | 30 volts |
| Welding arc | 5000 μf |
| Electrode spacing | 0.005–0.080 inch |
| Type joint | butt |

EXAMPLE II

| | |
|---|---|
| Work piece 6 | brass wire |
| Pre arc | 35 volts |
| Welding arc | 30,000 μf |
| Electrode spacing | 0.010–0.080 inch |
| Type joint | butt |

EXAMPLE III

| | |
|---|---|
| Work piece 6 | brass ring shank (⅛ inch wide by 1/16 inch thick) |
| Pre arc | 60 volts |
| Welding arc | 45,000 μf |
| Electrode spacing | 0.005–0.090 inch |
| Type joint | butt |

Thus, pursuant to the invention, a high voltage, several times higher than normal welding voltage, is used to ionize the atmosphere between the electrode and the work piece. This pre arc need only be for a short period of time, in the order of micro or milliseconds. This is followed by a short duration weld arc of low voltage, high amperage. The work piece may be any of a variety of metals including mild steel, sterling silver, gold alloys, brass alloys, nickel alloys to list a few. The size of the wire is generally between approximately 0.010 inch and 0.062 inches and formed with either butt or bias joints. The gap is generally between approximately 0.001 and 0.09 inch. The bank of capacitors shown (C13–C15) gives a choice of charge between 5,000 and 90,000 microfarads, however, it will be understood that stored or continuous energy, AC or DC, can be employed. Further, although an arc generator is shown in the drawings, other field producing means can be used such as magnetos, coils and capacitors. The voltage of the first or ionizing arc is between 100 and 2000 volts.

The controlled atmosphere, which although not essential is preferred because it minimizes carbon residue at the work piece and helps to keep electrode 75 clean. The particular atmosphere employed can be nitrogen, argon and/or helium. The electrode, in addition to tungsten, could be of other suitable material such as beryllium cooper or molybdenum.

The foregoing and other advantages are obvious to those skilled in the art.

We claim:

1. A process for welding small diameter wire into a closed loop comprising the steps of presenting, supporting and forming a selected length of wire in the range of approximately 0.010 inch to 0.062 inch diameter, having two opposite ends into an essentially closed loop with the ends of the wire closely disposed to each other, positioning an electrode having a tip end within an open ended sleeve with the tip end spaced inwardly from the open end of the sleeve, placing the open end of the sleeve member closely adjacent to the ends of the wire, means for producing a short duration flow of energy between the electrode and the ends of the wire including establishing a first high voltage arc between the electrode and the ends of the wire and thereafter creating a second low voltage, high amperage arc between the electrode and the ends of the wire and then deenergizing the electrode before the next length of wire to be welded is presented.

2. A process according to claim 1 in which the work piece is a wire between approximately 0.010 inch and 0.062 inch and the electrode at the time of the welding arc is spaced from the work piece between approximately 0.001 inch and 0.050 inch.

3. A process according to claims 1, or 2 in which the first arc is between approximately 100 to 2000 volts.

4. A process according to claim 1 in which the first arc is produced by providing a frequency generator coupled to a transformer which is in turn connected across an air gap and connected to a capacitor and a coupling transformer whereby the combination of charge and discharge on the transformer, air gap and capacitor occurs at a high rate producing an effectively continuous high voltage.

5. A process according to claim 1 in which at the time of welding the electrode is spaced from the ends of the wire in the range of approximately 0.001 inch to 0.090 inch and the first arc is maintained until the second arc occurs and the flow of energy is completed in a fraction of a second.

6. A welding system for welding small diameter wire in the range of approximately 0.010 inch to 0.062 inch comprising means for supporting and forming a selected length of wire having two opposite ends into an essentially closed loop with the ends of the wire closely disposed to each other, an elongated electrode having a tip end for transmitting electrical energy to a work piece, a generally cylindrical, electrically insulative sleeve member with an open end, the electrode telescopically received within the sleeve member with the tip end of the electrode spaced axially inwardly from the open end of the sleeve member, means for placing the open end of the sleeve member closely adjacent to the ends of the wire with the tip end of the electrode spaced from the ends of the wire in the range of approximately 0.001 inch to 0.090 inch, means for establishing a flow of selected gas out through the open end of the sleeve member, means for generating a first relatively high voltage, ionizing arc between the electrode and the wire ends and means for generating a second relatively low voltage, high amperage arc after the first arc is established to effect welding of the wire ends to one another with minimal marring of the outer surface of the wire.

7. A welding system comprising a base (12), electrode means (75) mounted on the base for transmitting electrical energy to a work piece (9) and a power source (112) for providing said electrical energy characterized in that electrode positioning means (86) (40) (52) (59) (78) are provided for spacing the electrode a selected distance from the work piece for the transmission of the electrical energy thereto, the electrode positioning means includes an electrode assembly (36) having a generally cylindrical, electrically insulative sleeve member (86) with an open tip end, the electrode (75) telescopically received within the sleeve member with an end of the electrode spaced axially inwardly from the open end of the sleeve member, the electrode means also includes an elongated arm (32) having two opposite ends, the electrode assembly (36) supported at one of the opposite ends, and motor means (14) to move the electrode assembly between a retracted position removed from a work piece station and a protracted position, a slot (38) is provided in the elongated arm extending along its length and a height adjusting member (40) is mounted on the base and adapted to extend into the slot, the height adjusting member being adjustably movable relative to the direction of movement of the elongated arm between its retracted and protracted positions to thereby adjust the height of the one end of the elongated arm.

8. A welding system according to claim 7 further characterized in that the electrode is adjustably, axially movable (78) within the sleeve member.

9. A welding system according to claim 8 further characterized in that a spacing member (94) having a bore extending therethrough is provided, the electrode is received in the bore and disposed within the sleeve member to maintain the electrode in a coaxial position therewith.

10. A welding system according to claim 7 further characterized in that an aperture (90) is provided inside of the sleeve member and gas conduit means (92) is connected to the aperture so that a selected atmosphere can be provided in the vicinity of that portion of the work piece to be welded.

11. A welding system according to claim 7 further characterized in that the other end of the elongated arm is connected to the motor means through a bell crank (22,20) and an adjustable stop (52) is positioned adjacent the bell crank to limit the movement of the bell crank and concomitantly the elongated arm and electrode assembly to a predetermined point.

12. A welding system according to claim 7 further characterized in that the electrode (75) and sleeve member (86) are received in an electrode holder, the holder having a longitudinal axis perpendicular to the longitudinal axis of the electrode, and the holder being adjustably rotatably mounted at the one end of the elongated arm.

13. A welding system according to claim 7 further characterized in that first means (130) are provided to generate a first high voltage arc and second means (C13-15) arc provided to generate a low voltage, high amperage welding arc between the electrode and the work piece, and control means (IC6, IC3) are provided to produce the first arc prior to the second arc.

14. A welding system comprising a base (12), electrode means (75) mounted on the base for transmitting electrical energy to a work piece (9) and a power source (112) for providing said electrical energy characterized in that electrode positioning means (86) (40) (52) (59) (78) are provided for spacing the electrode a selected distance from the work piece for the transmission of the electrical energy thereto, the electrode positioning means includes an electrode assembly (36) having a generally cylindrical, electrically insulative sleeve member (86) with an open tip and, the electrode (75) telescopically received within the sleeve member with an end of the electrode spaced axially inwardly from the open end of the sleeve member, the electrode positioning means also includes an elongated arm (32) having two opposite ends, the electrode assembly (36) supported at one of the opposite ends, and motor means (14) to move the electrode assembly between a retracted position removed from a work piece station and a protracted position, a camming surface (98) is attached to the elongated arm and movable therewith and an elongated shield arm (102) having two opposite ends is pivotably connected to the base at one end of the shield arm, a shield (106) is mounted at the other end of the shield arm and adapted to move toward and away from the work piece station as the shield arm pivots, and a cam follower (100) is mounted on the shield arm intermediate its ends and is adapted to ride on the camming surface so that the shield will be disposed at the work piece station when the elongated arm is at its protracted position and will be away from the work piece station when the elongated arm is at its retracted position.

15. A welding system according to claim 14 further characterized in that the work piece station includes a work support (4), means are provided for positioning a work piece in the work support with the work piece projecting therefrom and the shield is configured to extend around three sides of the work piece leaving a fourth side accessible by the electrode assembly.

* * * * *